Oct. 21, 1930.   J. G. KING ET AL   1,779,097
REFRIGERATING APPARATUS
Original Filed May 30, 1923   2 Sheets-Sheet 1

Witnesses
Charles E. Greene
Lloyd M. Keigley

Inventor
Jesse G. King and
Harry B. Hull
By J. Ralph Fiehr
Their Attorney

Patented Oct. 21, 1930

1,779,097

UNITED STATES PATENT OFFICE

JESSE G. KING AND HARRY B. HULL, OF DAYTON, OHIO, ASSIGNORS, BY MESNE ASSIGNMENTS, TO GENERAL MOTORS RESEARCH CORPORATION, OF DAYTON, OHIO, A CORPORATION OF DELAWARE

REFRIGERATING APPARATUS

Application filed May 30, 1923, Serial No. 642,365. Renewed November 9, 1927.

The present invention relates to refrigerating cabinets and particularly to the linings and partitions thereof.

One of the aims of the invention is to reduce the cost of the lining of the cabinet and the partition for separating the food and cooling compartment.

The present invention embodies a cabinet in which the lining thereof is rectangular in shape and is continuous, the compartments being separated by a partition which can be previously constructed and mounted in the cabinet.

Other and further objects of the present invention will be apparent from the following description, reference being had to the accompanying drawings wherein a preferred embodiment of one form of the present invention is clearly shown.

Figure 1:
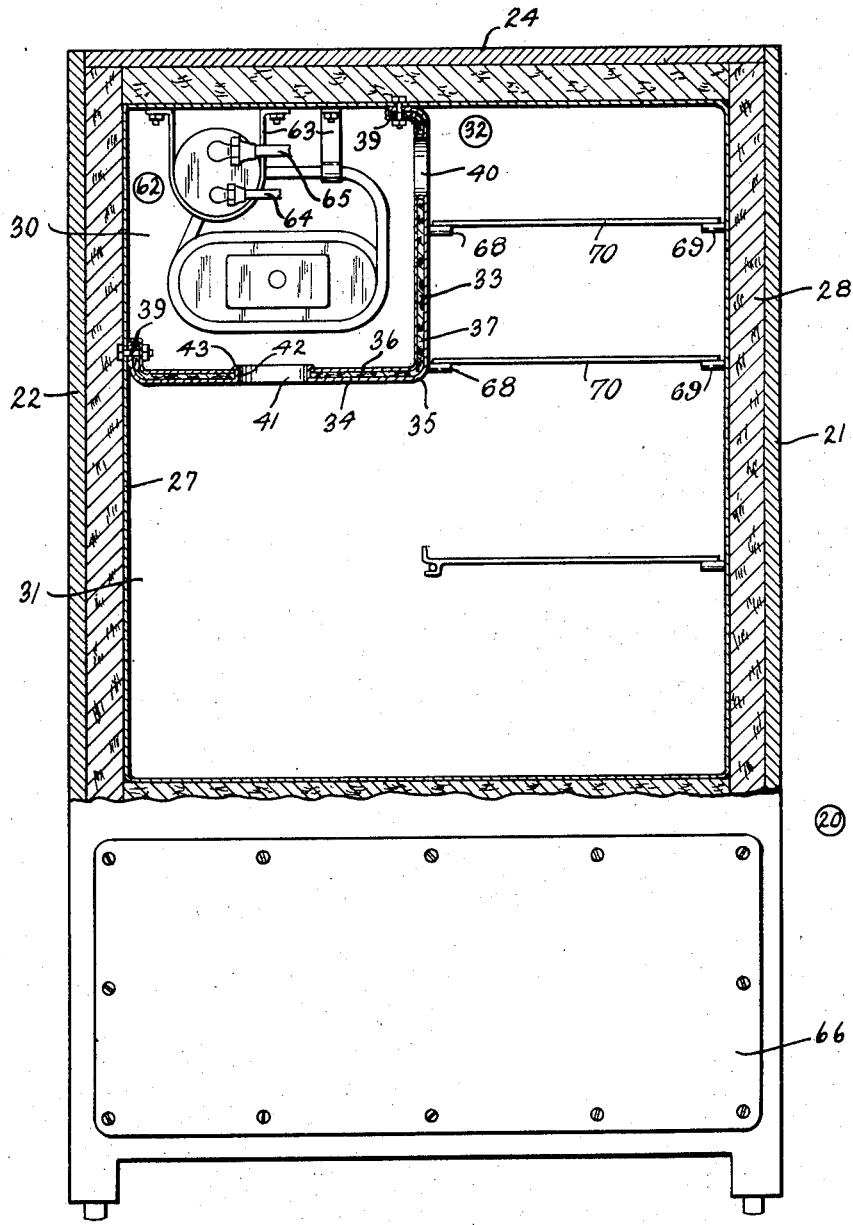
Fig. 1 is a front view of a refrigerating cabinet partly in section and partly in elevation showing one form of the invention.

Referring to the drawings, 20 is a refrigerating cabinet having side walls 21 and 22, a back wall 23 and top wall 24. The cabinet also comprises a rectangular shaped continuous lining 27 which is insulated from the wall of the cabinet by insulating material 28. The lining 27 is closed on all of its sides except the front which is open to provide for access to the interior.

The cabinet 20 is divided into a cooling compartment 30 and a food compartment 31 by an insertable partition 32. Partition 32 comprises a vertical wall 33 and a horizontal wall 34 and includes a food compartment lining 35 and a cooling compartment lining 36 which are separated by insulating material 37. In Fig. 1 the partition 32 is secured to the top wall and one of the side walls of the lining 27 by any suitable means such as bolts 39. In this embodiment of the invention both walls 33 and 34 of the partition 32 are provided with passages 40 and 41 respectively, the lining 35 being turned inwardly as at 42 and suitably secured by means of brazing to the lining 36. The inwardly extending portion 42 of the bottom wall extends a substantial distance above the lining 36 to provide a ledge 43. This ledge prevents the ready flow of condensed liquid from the cooling compartment to the food compartment through the passage 41.

Figure 2:
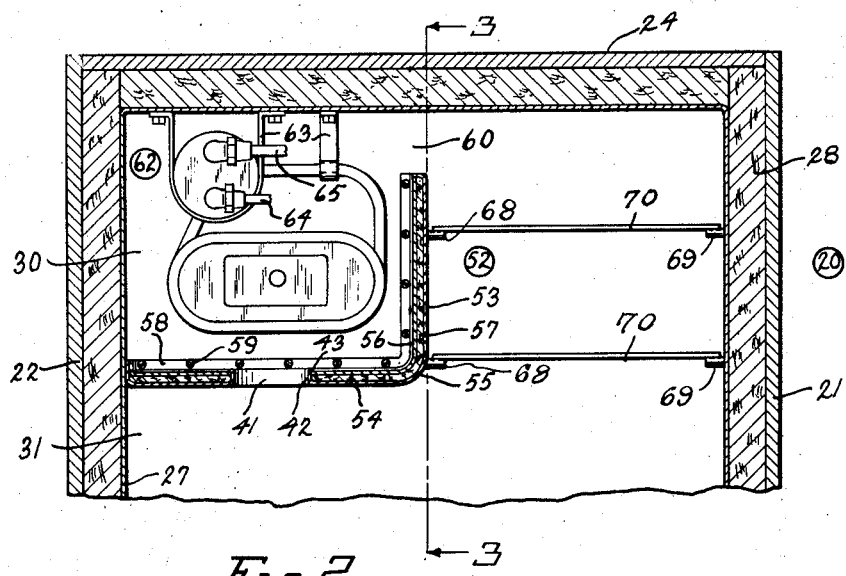
Fig. 2 is a fragmentary sectional view of a cabinet showing another form of the invention.
Figure 3:
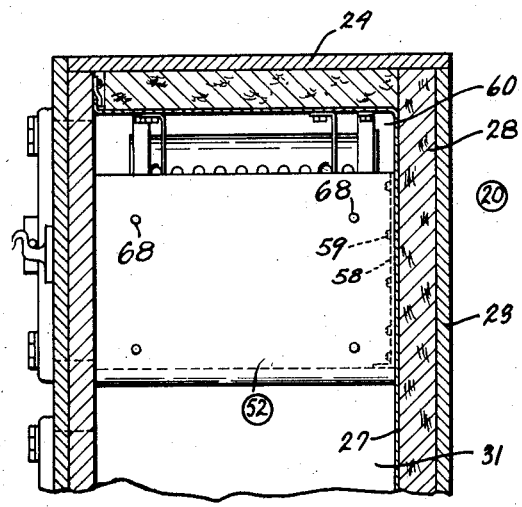
Fig. 3 is a sectional view taken on line 3—3 of Fig. 2.

In the embodiment shown in the Figs. 2 and 3 the lining 27 is also rectangular in shape and the cabinet is separated into a food compartment 31 and a cooling compartment 30 by a partition 52 forming a vertical wall 53 and a horizontal wall 54 which comprises a food compartment lining 55 and a cooling compartment lining 56 separated by insulation 57. The lining 56 is provided with right angular bends 58 by which the partition 52 is secured to the back wall of the lining 27 by screws 59. A passage 41 is provided in the horizontal wall 54 and a passage 60 is formed between the upper part of the compartments 30 and 31 by terminating the vertical wall 53 below the top wall of the lining 27.

An evaporating chamber 62 is carried by strap 63 and is located within the cooling compartment 30. Evaporator 62 is connected by pipes 64 and 65 to refrigerating apparatus (not shown) which may be contained in the lower part 66 of the cabinet 20. The evaporator 62 absorbs heat from the food compartment thus causing circulation of air downwardly through the passage 41, food compartment 31, passage 40 in Fig. 1 or through passage 60 in Figs. 2 and 3. The insulation 33, 57 of the partitions 32, 52, respectively, is adapted to insulate the food compartment lining 35, 55 from the cooling compartment 30 to prevent condensation on said lining.

From the foregoing description it is apparent that the present invention provides for lining and partitioning in very simple manners. The rectangular lining 27 can readily be constructed of sheet metal welded or otherwise jointed to provide a continuous lining. A previously formed separator having insulated lining walls can be attached to the lining to divide the cabinet into food and cooling compartments.

Another feature of the present invention is the manner of supporting the food shelves in a cabinet having a removable partition and particularly the shelves in that portion of the food compartment which is disposed laterally of the cooling compartment. In the present invention we secure shelf pegs 68 on the removable partitions 32 and 52 which cooperate with the shelf pegs 69 carried by the side walls of the cabinets for supporting shelves 70.

While the form of mechanism herein shown and described constitutes a preferred embodiment of one form of invention, it is to be understood that other forms might be adopted and various changes and alterations made in the shape, size, and proportion of the elements therein without departing from the spirit and scope of the invention.

What is claimed is as follows:

1. A refrigerator cabinet having a continuous cabinet lining of rectangular contour; and a removable L-shaped partition supported within and attached to the cabinet lining at the ends of said partition for dividing the cabinet into an L-shaped food compartment and a rectangularly shaped cooling compartment, a passage provided by the partition for the circulation of air from the cooling compartment into the horizontal leg of the L-shaped food compartment and a passage provided by the partition for the circulation of air from the vertical leg of said L-shaped food compartment to the cooling compartment.

2. A refrigerator cabinet having a continuous cabinet lining of rectangular contour; and a removable L-shaped partition supported within and attached to the cabinet lining for dividing the cabinet into an L-shaped food compartment and a rectangularly-shaped cooling compartment, a passage provided by the partition for the circulation of air from the cooling compartment into the horizontal leg of the L-shaped food compartment and a passage provided by the partition for the circulation of air from the vertical leg of said L-shaped food compartment to the cooling compartment.

3. In combination, a refrigerator cabinet having a continuous cabinet lining of rectangular contour; a cooling unit carried by and within the cabinet; and a unitary partition supported within and attached to the cabinet lining for dividing said cabinet into a cooling compartment for said cooling unit and a food compartment, said food compartment having a portion disposed below and a portion disposed laterally of the cooling compartment, a passage provided by the partition for the passage of air from the laterally disposed portion of the food compartment to the cooling compartment, and a passage provided by the partition for the passage of air from the cooling compartment to the portion of the food compartment below the cooling compartment, said partition being removable without removing said cooling unit.

4. In combination, a refrigerator cabinet having a continuous cabinet lining of rectangular contour; a cooling unit carried by and within the cabinet; and a unitary partition supported within and attached to the cabinet lining for dividing said cabinet into a cooling compartment disposed at the top of the cabinet and a food compartment at least a part of which is disposed below said cooling compartment, a passage provided by the partition for the passage of air from the food compartment to the upper portion of the cooling compartment and a passage provided by the partition for the passage of air from the lower part of the cooling compartment to the food compartment, said partition being removable without removing said cooling unit.

In testimony whereof we hereto affix our signatures.

JESSE G. KING.
HARRY B. HULL.